United States Patent [19]

Stroud

[11] 4,354,127

[45] Oct. 12, 1982

[54] ALTERNATOR WINDING

[76] Inventor: Lebern W. Stroud, 3237 Gerome, Forth Worth, Tex. 76118

[21] Appl. No.: 172,826

[22] Filed: Jul. 28, 1980

[51] Int. Cl.$^3$ .............................................. H02K 3/00
[52] U.S. Cl. ................................... 310/198; 310/208
[58] Field of Search ................................. 310/198–208

[56] References Cited

U.S. PATENT DOCUMENTS 4,161,683  7/1979  Stroud et al. .................... 310/208 X
4,200,817  4/1980  Bratoljic ............................... 310/198

OTHER PUBLICATIONS

*Standard Handbook for Electrical Engineering*, Knowlton, McGraw-Hill, pp. 236–238.

Primary Examiner—Donovan F. Duggan
Attorney, Agent, or Firm—Wofford, Fails & Zobal

[57] ABSTRACT

A coil winding configuration for a three phase winding connected in a Delta configuration for the stator of an alternator for providing a high output at low engine rpm. Each phase of the winding comprises 14 coils which are located in the slots of a 42 slot stator with 8 turns in each slot. Each of the windings is formed of 14 A.W.G. electrically conductive wire.

1 Claim, 5 Drawing Figures

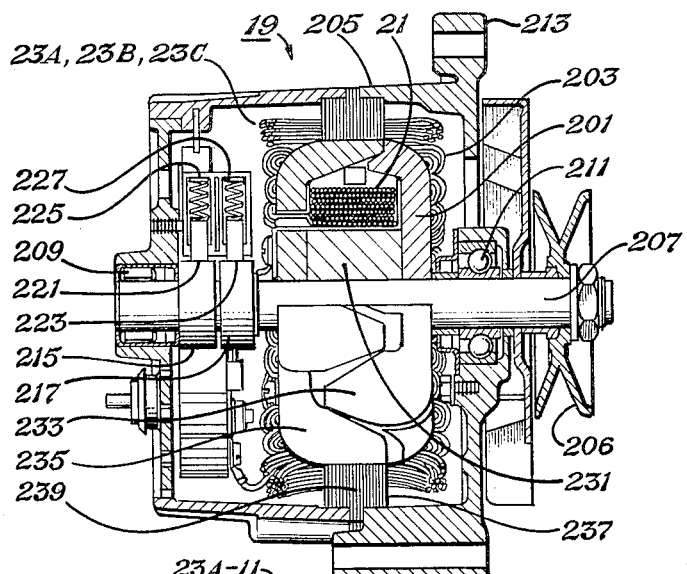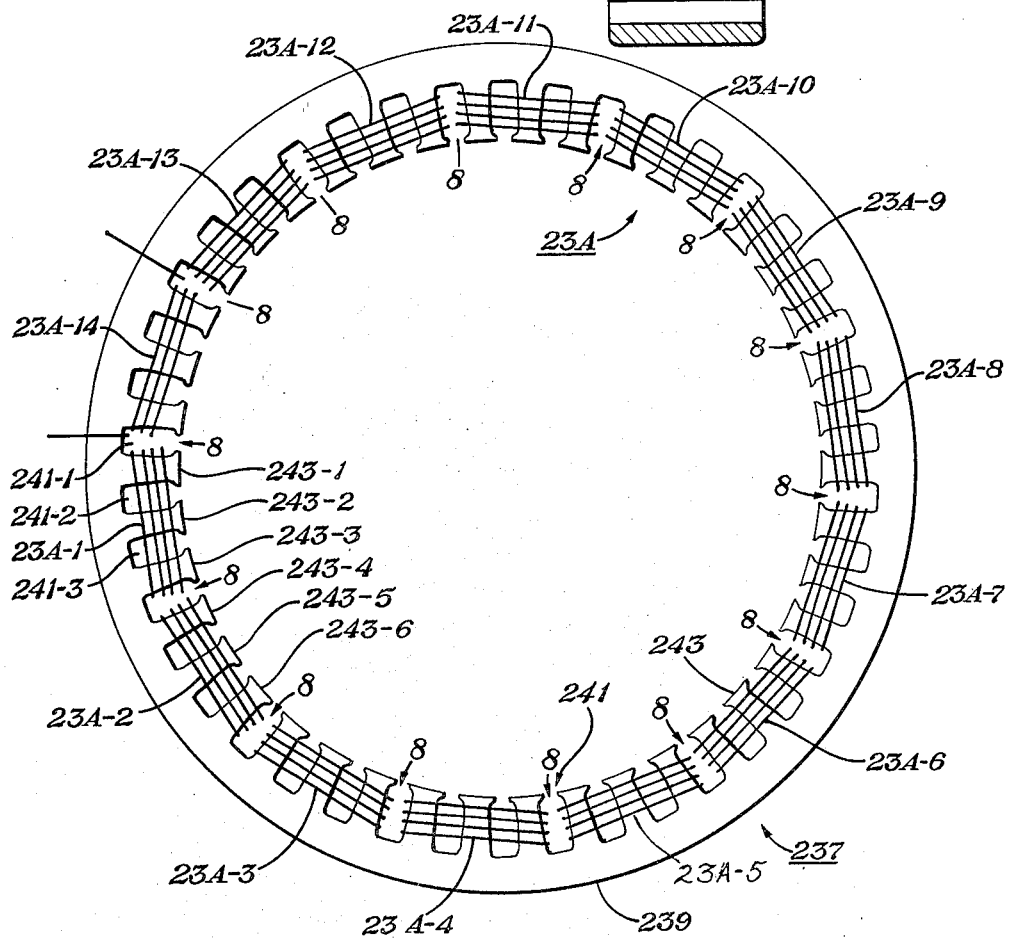

ALTERNATOR WINDING

FIELD OF THE INVENTION

The present invention relates to an alternator coil winding for use in a single alternator employed on an emergency vehicle such as a ambulance and for use in an alternator employed in a pulsed welding system disclosed in U.S. patent application Ser. No. 121,989.

DESCRIPTION OF THE PRIOR ART

U.S. Pat. No. 4,161,683 discloses an alternator having a stator comprising an annular stator core having 42 segments with adjacent segments separated by a slot such that there are 42 slots. A three phase stator winding is provided, with each winding comprising 14 coils, each coil encircling three segments. The coils of the windings are wound such that when the windings are fitted in place in the stator, each slot has six wires passing through it. This alternator does not produce enough output at low engine rpm to be used on an ambulance. Moreover, it will not meet the Federal Regulations of a minimum of 120 amps for ambulance purposes. It produces too much voltage to be used in the pulsed welding system of U.S. patent application Ser. No. 121,989.

Delco-Remy, a division of General Motors produces an alternator using 15-20 A.W.G. (American Wire Gage) for its three coil windings which are connected in a Y configuration. Adjacent coils of each winding have totally eight turns located in every third slot of the stator core. For a given winding, each coil at one edge has four turns and at the opposite edge, adjacent coils have five and three turns. The alternator produces a maximum of about sixty-three amps of current. This is not enough current for ambulance operation and its voltage output is too high for pulsed welding operations.

U.S. patent application Ser. Nos. 33,443 and 51,910 disclose other types of alternator coil windings.

The alternator coil winding of U.S. patent application Ser. No. 33,443 was developed specifically for emergency vehicles such as ambulances. The alternator works satisfactory at engine idle of about 900 rpm. In many cases in the actual operation of the ambulances, the high temperature caused the engines to diesel. To avoid this situation, the mechanics would adjust the engine idle to a much lower rpm. Problems occurred in that the alternator could not carry the load at the lower engine idle. It does not produce enough voltage to be used for pulsed welding use.

The alternator of U.S. patent application Ser. No. 51,910 doesn't produce enough output at low engine rpm for ambulance use and doesn't produce enough amps for pulsed welding use.

SUMMARY OF THE INVENTION

It is an object of the present invention to provide an alternator which may be used in a single configuration for ambulance purposes or for a pulsed welding system.

The alternator is of the type having an annular stationary stator with a rotor concentrically located therein. It comprises an annular structure formed of ferro-magnetic material defining an annular stator core having forty-two segments with adjacent segments being separated by a slot such that there are forty-two slots which extend in a direction parallel to the axis of said stator core, and a three phase stator winding connected in a delta configuration. Each phase comprises a winding having fourteen coils extending around said stator core on the inside thereof. Each of the coils of each phase comprises a plurality of turns of wire encircling three segments. The fourteen coils of each phase have a plurality of turns located in fourteen of said slots such that said fourteen slots for each phase respectively has the following number of turns, 8, 8, 8, 8, 8, 8, 8, 8, 8, 8, 8, 8, 8, 8. The fourteen coils of each phase respectively having the following number of turns at one edge 5, 3, 5, 3, 5, 3, 5, 3, 5, 3, 5, 3, 5, 3 and the following number of turns at the other edge 4, 4, 4, 4, 4, 4, 4, 4, 4, 4, 4, 4, 4, 3. Each of the windings are formed of 14 A.W.G. electrically conductive wire.

BRIEF DESCRIPTION OF THE DRAWINGS

FIG. 3 is a cross section of an alternator.

FIG. 5 is a plan view of the stator core of an alternator with the coil winding of FIG. 1 installed around its segment.

DESCRIPTION OF THE PREFERRED EMBODIMENTS

Figure 1:
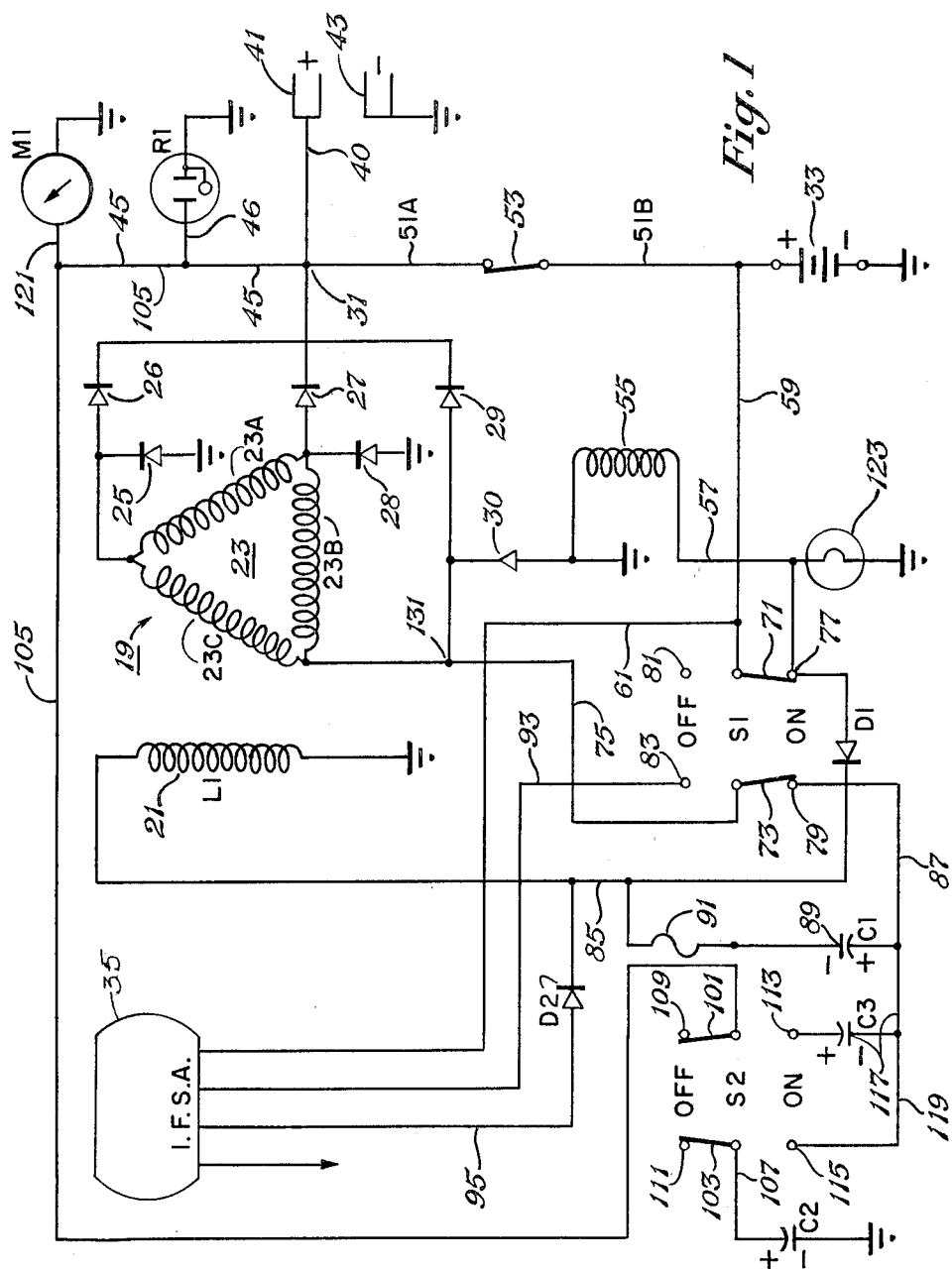
FIG. 1 is an electrical schematic of a pulsed welding system employing the alternator of the present invention.
Figure 2:
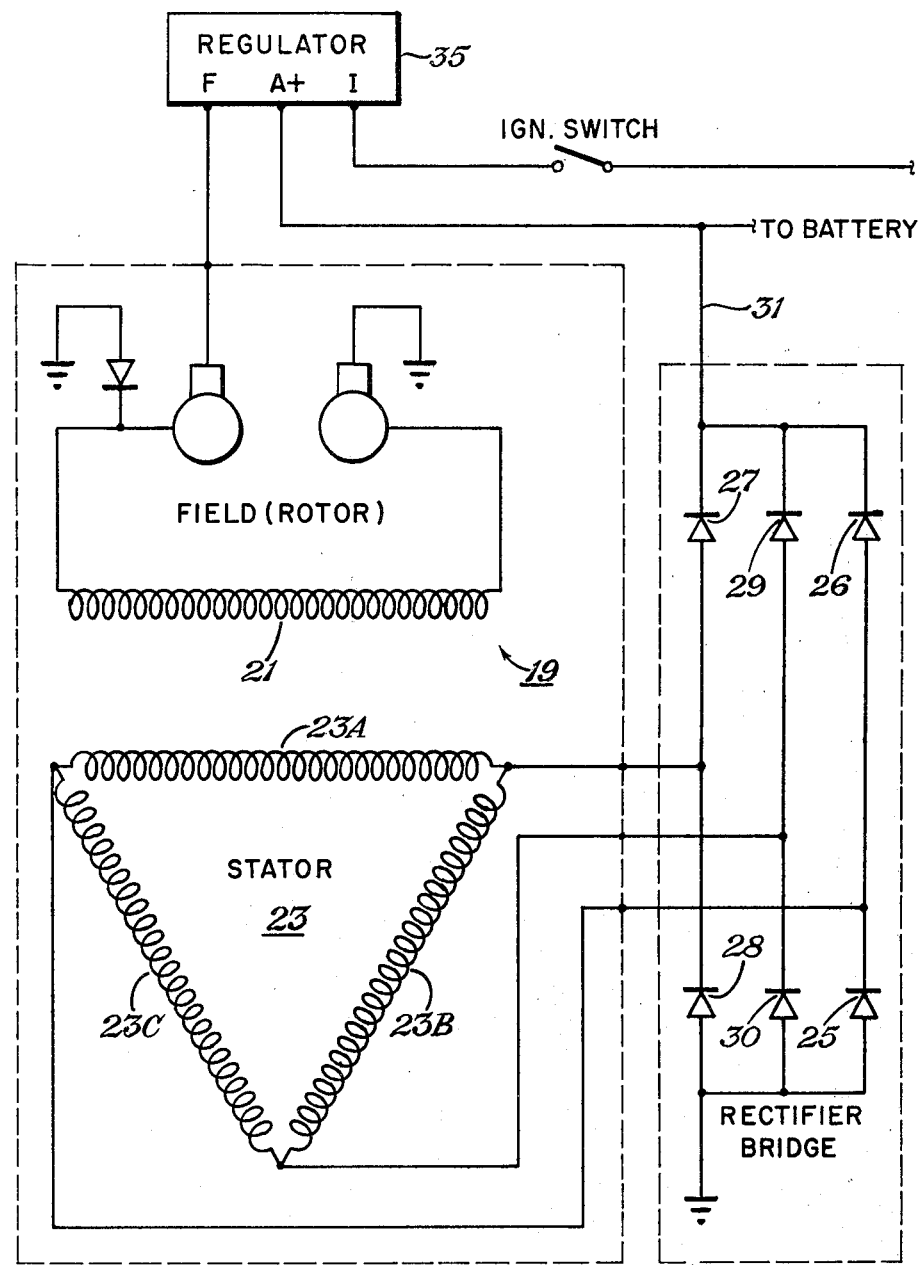
FIG. 2 is an electrical schematic of a charging system which may be used in an ambulance and which employs the alternator of the present invention.

Referring to FIGS. 1 and 2, reference numeral 19 identifies an alternator which comprises a three-phase delta winding 23 for its stator core. The alternator is of the type employed in motor vehicles. The three windings of the windings of the stator connected in a delta configuration are identified at 23A, 23B and 23C. The rotor coil is identified at 21. A regulator is identified at 35. An external diode bridge comprising diodes 25-30 are connected to the windings 23A, 23B and 23C for converting the A.C. output to D.C. The output of the alternator is identified at 31.

Referring to FIG. 3, other details of the alternator will be described. The alternator 19 comprises a rotor 201 and a stator 203, the latter of which is fixedly carried by a housing or case 205. Rotor 201 is rotatably carried by the case by a shaft 207 which is journaled by roller bearings 209 and ball bearings 211 to the case 205. Brackets 213 formed to the case 205 are adapted to receive bolts for coupling the alternator to mounting means adjacent the engine of the vehicle. A pulley 206 is mounted to the shaft 207 for receiving the belt from the engine for rotating the rotor 201.

Shaft 207 has two slip rings 215 and 217 mounted rigidly to it and insulated from each other and from the shaft. Slip rings 215, 217 are connected by conductors (not shown) to the coil 21 of rotor 201. Carbon brushes 221 and 223 are biased by springs 225 and 227 into sliding contact with the slip rings 215 and 217. Slip rings 215, 217 and brushes 221, 223 provide a connection for applying a D.C. exciting voltage to the rotor 201.

Rotor 201 comprises a ferro-magnetic core 231 which is wound with conductive wire defining the rotor coil 21. The opposite sides of the core 231 have end portions which form north and south poles 233 and 235. The poles are formed into seven north poles and seven south poles which extend inward and mesh, but do not touch, with a corresponding pole of the opposite polarity.

Stator 203 comprises an annular core 237 formed of a plurality of stacked ferro-magnetic plates 239. A plan view of the core 237 is shown in FIG. 5. As seen in this figure, there are forty-two slots 241 formed in the stator core 237. Slots 241 extend parallel to the axis of the core 237 the full width of the core.

In the preferred embodiment, the depth of the slots 241 is slightly more than one half of the radial thickness of the core. The core 237 is approximately 5¼ inches in outside diameter, 13/16 of an inch wide longitudinally and 9/16 of an inch thick radially. The slots 241 are approximately 5/16 of an inch deep, being about 1/16 of an inch wide at the entrance and about ⅛ of an inch wide at the inner portion. The forty two portions of the core between the slots 241 are defined as segments 243. Rotor 201 is carried within the stator core 237, with the poles 233 and 235 being approximately 0.03 of an inch from segments 243.

The three stator windings 23A, 23B, and 23C each comprise fourteen loops or coils which are located in the slots 241 of the core 237. Each coil or loop of each winding encircles three segments 243 of the core. Electrically insulating inserts (not shown) are located in the slots between their wall structure and their wires to prevent electrical contact between the wires and the core. The stator windings are connected in a delta configuration as shown in FIGS. 1 and 2.

Figure 4:
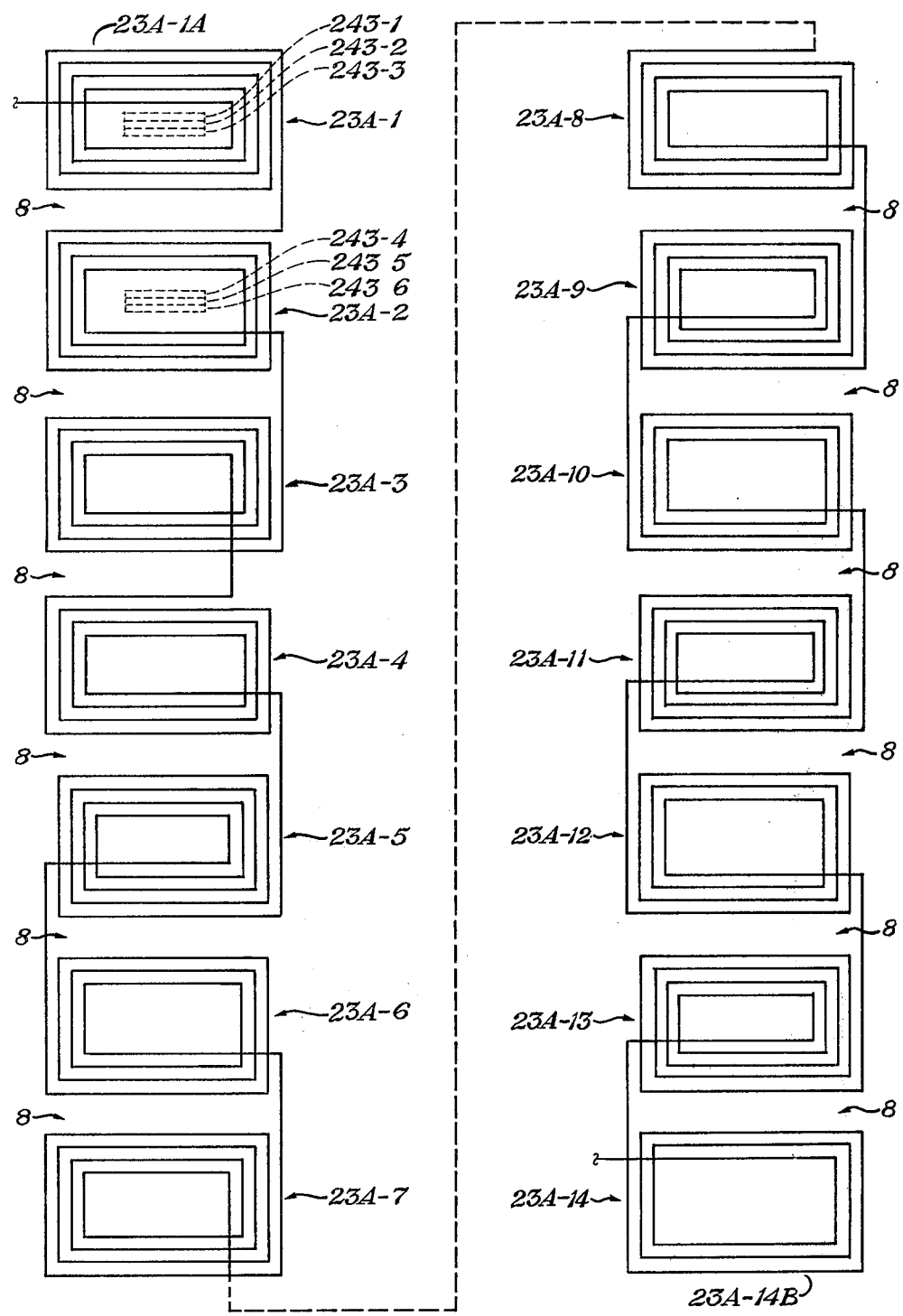
FIG. 4 illustrates the coil winding configuration of one phase of the alternator of the present invention.

The coil winding configuration for the alternator 19 is shown in FIGS. 4 and 5. Fourteen A.W.G. (American Wire Gage) copper wire is used to form the windings which are connected together in a delta configuration. Reference is made to Buchsbaum's Complete Handbook of Practical Electronic Reference Data, by William Buchsbaum (Prentice-Hall, Inc., 1978) for conversion from A.W.G. to inches. Referring to FIGS. 4 and 5, the coil winding configuration will be described. The coil winding in these figures is for one phase and it is identified as winding 23A of the alternator 19. The coil winding configuration for the other two phases, coil windings 23B and 23C is the same as that of coil winding 23A. As seen in FIG. 4, the outer edge 23A-1A of coil 23A-1 has five turns of wire. The outer edge 23A-14B of coil 23A-14 has three turns of wire. The total turns formed between adjacent coils from adjacent coils 23A-1 and 23A-2 to adjacent coils 23A-13 and 23A-14 are as follows: 8, 8, 8, 8, 8, 8, 8, 8, 8, 8, 8, 8, 8. The turns of the left hand edges of coils 23A-1 to 23A-14 as seen in FIG. 4 are as follows: 4, 4, 4, 4, 4, 4, 4, 4, 4, 4, 4, 4, 4, 3. The turns of the right hand edges of coils 23A-1 to 23A-14 as seen in FIG. 4 are as follows: 5, 3, 5, 3, 5, 3, 5, 3, 5, 3, 5, 3, 5, 3.

In the stator core of FIG. 5, edges 23A-1A and 23A-14B of the coil winding 23A are located in slot 241-1. Starting with slot 241-1 and going counterclockwise, it can be seen that every third slot has the following number of turns of windings 23A located therein: 8, 8, 8, 8, 8, 8, 8, 8, 8, 8, 8, 8, 8.

In FIG. 4, only the edge of the coil winding 23A having the turns 4, 4, 4, 4, 4, 4, 4, 4, 4, 4, 4, 4, 4, 3 is shown. In FIG. 5, core segments 243-1, 243-2 and 243-3 encircled by coil 23A-1 and core segments 243-4, 243-5 and 243-6 encircled by coil 23A-2 are depicted by dotted lines. In FIG. 4, the relative distance between the segments is not shown to scale.

Each of the coil windings 23B and 23C is the same as coil winding 23A. The turns of adjacent coils of windings 23B will be located in every third slot starting with slot 241-2 and going counterclockwise. The outer edges of the outer coils of winding 23B will be located in slot 241-2. Thus starting with slot 243-2 and going counterclockwise, every third slot will have the following number of turns of winding 23B located therein: 8, 8, 8, 8, 8, 8, 8, 8, 8, 8, 8, 8, 8. With the turns of the coils so located in every third slot, each coil or loop of winding 23B will encircle three segments 243. The turns of adjacent coils of winding 23C will be located in every third slot starting with slot 241-3 and going counterclockwise. The outer edges of the outer coils of winding 23C will be located in slot 241-3. Thus starting with slot 241-3 and going counterclockwise, every third slot will have the following number of turns from winding 23C located therein: 8, 8, 8, 8, 8, 8, 8, 8, 8, 8, 8, 8, 8. With the turns of coil 23C so located in every third slot, each coil or loop of winding 23C will encircle three segments 243.

An alternator as described above and having the three winding configurations as described in connection with FIGS. 4 and 5, connected in a delta and formed of fourteen A.W.G. copper wire will produce a high output at both high and low engine rpm.

Referring now to FIG. 1, there will be described the alternator of FIGS. 4 and 5 employed in a pulsed welding system incorporated in an automobile or truck. The rotor field coil 21 is rotated by the vehicle engine inside a stationary stator which comprises the three phase stator windings 23A, 23B, 23C. The phase windings 23A, 23B, and 23C are electrically 120 degrees apart and are connected in a Delta configuration as shown. Coupled to the stator windings is an external diode bridge comprising diode rectifiers 25–30. When the field coil 21 is excited electrically and rotated within the stator, alternating current will be induced in the three phase stator windings which will be rectified by the diodes whereby the output 31 of the three phase rectified system will be a pulsating voltage having a DC component. The frequency of the pulsating voltage will be dependent upon the rpm of the engine while the magnitude of the DC component will be dependent upon the engine rpm as well as the electrical input to the rotary field. In normal engine operation, the output at 31 is applied to charge a conventional 12 volt battery 33. Reference numeral 35 identifies a conventional regulator having terminals A, S, F, and I. In normal engine operation, the A terminal is connected to the output 31 of the alternator and to the battery 33. The regulator senses the voltage at the stator windings 23 by way of terminal S and if it increases beyond a certain level then the regulator reduces the input applied to the rotary field coil 21 by way of terminal F thereby dreducing the out of the alternator-rectifier system. In the conventional motor vehicle employing a 12 volt battery, the regulator limits the output of the three phase rectifier system to not greater than 15 volts DC to prevent overcharging the battery.

The system for allowing a welder or power tools to be operated off of the output of the alternator now will be described. Plug 41 coupled to output 31 by way of lead 40 and plug 43 coupled to ground are provided for allowing welding cables (not shown) to be coupled to the alternator output 31 and to ground to allow a welder to be operated off of the output 31. Electrical female receptacle R1 also is coupled to output 31 by way of leads 45 and 46 and to ground to allow power tools to be operated off of the output 31. The output 31 is coupled to the plus terminal of battery 33 by way of leads 51A, 51B and a normally closed relay switch 53 controlled by solenoid coil 55 which is coupled to ground and to lead 57. The plus terminal of battery 33 is coupled to the A terminal of regulator 35 by way of leads 59 and 61. A master switch S1 is provided having switch blades 71 and 73 coupled to leads 59 and 75 the latter of which is coupled to the juncture of phase windings 23B and 23C. Switch blades 71 and 73 are adapted to be moved together to an ON position to engage terminals 77 and 79 respectively as shown and to be moved together to an OFF position to engage terminals 81 and 83 respectively. Terminal 77 is coupled to lead 57 and to lead 85, the latter of which is connected to rotor field coil 21 by way of slip rings (not shown). Lead 85 also has a diode D1 coupled thereto. A feedback lead 87 is coupled to terminal 79 and to lead 85. Lead 87 includes feedback capacitor C1 (89) and a fuse 91. Terminal 83 is coupled to lead 93 which in turn is coupled to the S terminal of the regulator 35. The F terminal of the regulator 35 is coupled to lead 85 by way of lead 95 and diode D2.

Also provided is a power tool switch S2 having switch blades 101 and 103 coupled to leads 105 and 107 respectively. Lead 105 is coupled back to lead 45 and to output 31 while lead 107 includes a capacitor C2 which is coupled to ground. Switch blades 101 and 103 are adapted to be moved together to an OFF position to engage terminal 109 and 111 respectively as shown and to an ON position to engage terminals 113 and 115 respectively. Terminal 113 is coupled to lead 117 which is coupled to lead 87. Lead 117 includes a capacitor C3. Terminal 115 is coupled to lead 119 which is coupled to lead 117 and hence to lead 87.

Also provided is a volt meter M1 coupled to the output 31 by way of leads 121, and 45 and a pilot light 123 coupled to lead 57.

For normal vehicle operations, switch blades 71 and 73 of switch S1 will be in their OFF positions. In addition, switch blades 101 and 103 of switch S2 will be in their OFF positions. Thus the output 31 of the alternator will be coupled to battery 33 by way of lead 51A, closed switch 53 and lead 51B and the S terminal of regulator 35 will be coupled to the stator windings by way of lead 93, switch blade 73 and lead 75. In this condition, the output 31 of the alternator will charge the battery and the regulator 35 will regulate the output of the alternator since its S terminal is coupled to the stator windings and its F terminal is coupled to the rotor field coil 21. The voltage at output 31 is a pulsating DC voltage.

For welding operations, switch blades 71 and 73 of switch S1 will be moved to their ON positions and switch blades 101 and 103 of switch S2 will remain in their OFF positions. In addition, welding cables will be coupled to plugs 41 and 43. In this condition, switch blade 71 will engage terminal 77 and connect the pilot light 123 and the relay coil 55 to the battery 33. The pilot light 123 will be energized as well as relay coil 55 the latter of which will open switch 53 to disconnect the output 31 from the battery 33. When switch blade 73 is moved from terminal 83 to terminal 79, the regulator 35 will be switched out of the circuit and the stator windings will be coupled to the rotor field coil 21 by way of lead 75, switch blade 73, lead 87, capacitor 89 and lead 85.

With the engine running, and with no welding taking place, there is no load at the output 31 and the rotor field coil 21 is excited by the battery 33 by way of lead 59, switch blade 71, and lead 85. Diode D2 prevents voltage or current from being applied to the regulator. A DC field is set up across the rotor coil 21 whereby a DC field is induced into the stator windings. Since there is no welding load applied to the output 31, no current flows in the stator circuit. Thus the voltage at point 131 from the stator windings is DC. This voltage charges capacitor C1 but is not applied back to the rotor field coil 21 since the capacitor C1 will not pass DC.

As soon as an arc is struck by the welder and a load is applied to the output 31, current flows in the stator circuit and pulses are generated (pulsating direct current waves or spikes) in the stator circuit. Thus a pulsating DC voltage is developed across the stator windings which is present at point 131. Since the capacitor C1 will pass a pulsating DC voltage this pulsating DC voltage is applied to the rotor coil 21 to excite the coil. This pulsating DC voltage is applied to the rotor coil 21 by way of lead 75, switch blade 73, lead 87, capacitor C1 and lead 85. The pulsating voltage passed by capacitor C1 exceeds the applied 12 volt DC voltage from battery 33 thereby reverse biasing diode D1 and blocking current flow from the battery 33 to the rotor field. Field excitation is applied from the battery through D1 at the time of complete discharge of C1 when its voltage falls below 12 volts. Thus a pulsating field is set up across the rotor coil 21 which appears in the stator windings as an additive or increased voltage and current resulting in an increased output at 31 which is pulsating DC. A pulsating DC output is desirable for welding purposes in order to obtain a welding arc. As the load increases, the current increases in the rotor circuit, thereby increasing the output of the stator circuit. A decrease in the load decreases the rotor current and reduces the output of the stator circuit. When the load is removed, the rotor coil 21 again becomes excited only by the battery 33. Thus the system is completely automatic and the output produced at 31 depends upon the load applied. The system has advantages over that disclosed in U.S. Pat. No. 3,770,976 in that there are fewer parts to create trouble; no mechanical switching since the system operates on demand; it can produce a higher power output; it can handle larger welding rod sizes; there is reduced phase shift between rotor and stator due to in phase syncronizing pulses; and it simplifies arc stabalization by its pulsating DC output resulting in ease of operation.

For power tool operations, switch blades 71 and 73 are maintained in the ON positions and switch blades 101 and 103 are moved to their ON positions. An electrical cable from the power tool has its prongs plugged into receptacle R1. When the power tool is turned on, the capacitors C2 and C3 act to increase the voltage at the output 31 and to filter the voltage to prevent a pulsating DC voltage from being applied to the power tool which may otherwise burn out the switch of the power tool. The capacitors C2 and C3 act as a voltage doubler and nearly double the voltage output at 31. Since the capacitors filter the AC component, a DC voltage is developed at point 131 which is not passed by the capacitor C1. Thus the rotor field is excited by the battery 31. The voltage developed at the output 31 will be DC. The power tools which can be operated off of the output 31 are of the type having a DC motor.

An alternator as described above and having the three winding configurations as described in connection with FIGS. 4 and 5, connected in a Delta and formed of fourteen A.W.G. copper wire will produce a high output at both high and low engine rpm. Tests have shown the alternator to produce the following output in amps at the given rpm. The alternator was driven by a standard 2⅜ inch pulley. The vehicle was fitted with a standard factory installed 7¾ inch General Motors pulley 0.50 amps at 740 rpm; 60 amps at 800 rpm; 80 amps at 900 rpm; 88 amps at 1000 rpm; 97 amps at 1100 rpm; 104 amps at 1200 rpm; 107 amps at 1300 rpm; 112 amps at 1400 rpm; 113 amps at 1600 rpm; 117 amps at 1700 rpm; 120 amps at 1800 rpm; 128 amps at 2000 rpm; 131 amps at 2200 rpm; and 136 amps at 2600 rpm.

I claim:

1. An alternator of the type having an annular stationary stator with a rotor concentrically located therein, comprising:

an annular structure formed of ferro-magnetic material defining an annular stator core having forty-two segments with adjacent segments being separated by a slot such that there are forty-two slots which extend in a direction parallel to the axis of said stator core, and a three phase stator winding connected in a delta configuration, each phase comprising a winding having fourteen coils extending around said stator core on the inside thereof, each of said coils of each phase winding comprising a plurality of turns of wire encircling three segments, said fourteen coils of each phase winding having a plurality of turns located in fourteen of said slots such that said fourteen slots for each phase respectively has the following number of turns located therein 8, 8, 8, 8, 8, 8, 8, 8, 8, 8, 8, 8, 8, 8, said fourteen coils of each phase winding respectively having the following number of turns at one edge 5, 3, 5, 3, 5, 3, 5, 3, 5, 3, 5, 3, 5, 3, said fourteen coils of each phase winding respectively having the following number of turns at the other edge 4, 4, 4, 4, 4, 4, 4, 4, 4, 4, 4, 4, 4, 3, each of said phase windings being formed of 14 A.W.G. electrically conductive wire.

* * * * *